March 11, 1941. R. E. RUNDELL Re. 21,746

CIGAR BUNCH MACHINE

Original Filed Dec. 16, 1932 3 Sheets-Sheet 1

INVENTOR
Rupert E. Rundell
BY
Sydney J. Brescott
ATTORNEY

March 11, 1941. R. E. RUNDELL Re. 21,746

CIGAR BUNCH MACHINE

Original Filed Dec. 16, 1932 3 Sheets-Sheet 2

INVENTOR
Rupert E. Rundell
BY
Sydney J. Prescott
ATTORNEY

March 11, 1941. R. E. RUNDELL Re. 21,746
CIGAR BUNCH MACHINE
Original Filed Dec. 16, 1932 3 Sheets-Sheet 3
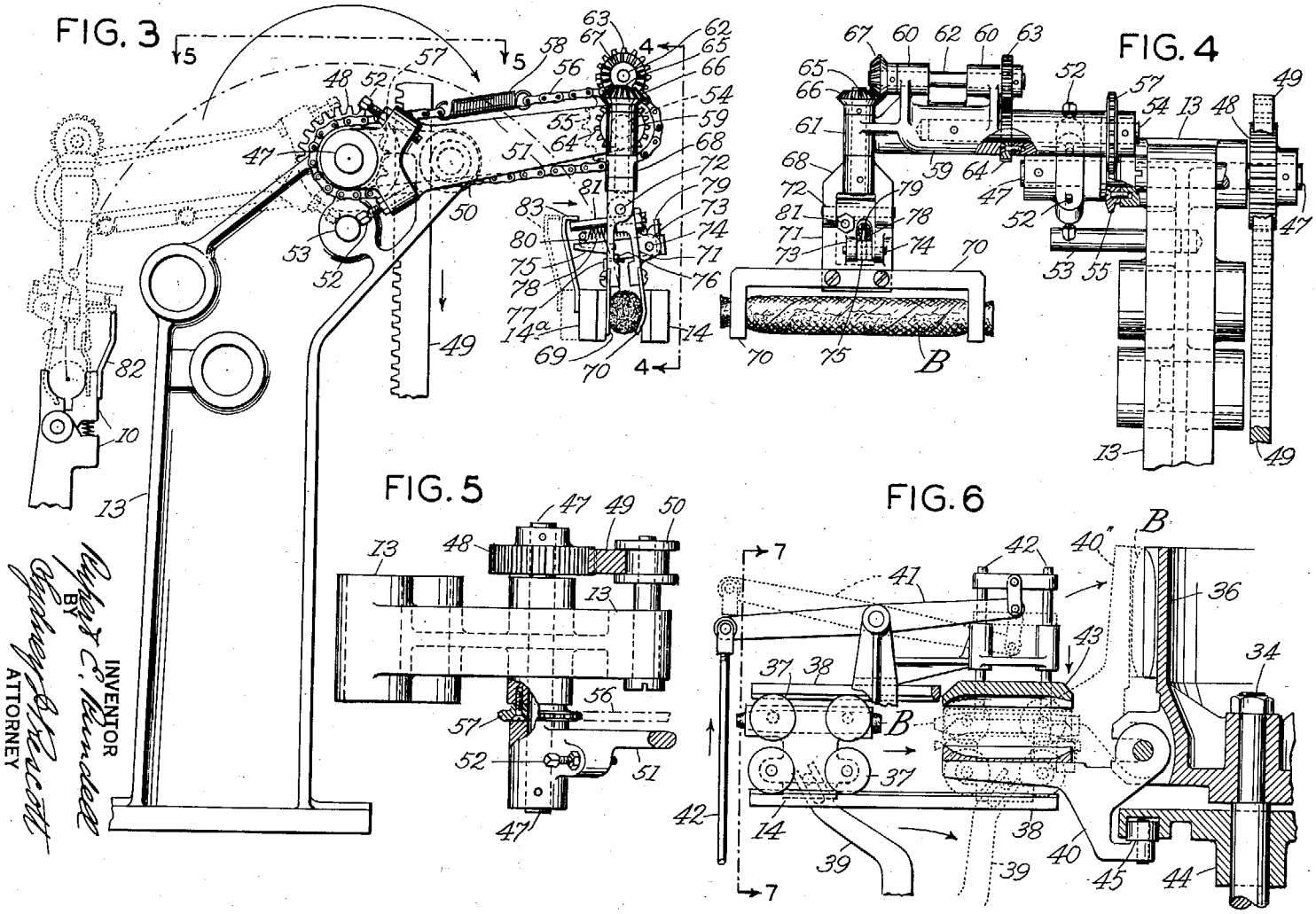
INVENTOR
Rupert E. Rundell
BY
Sydney J. Prescott
ATTORNEY Reissued Mar. 11, 1941

Re. 21,746

UNITED STATES PATENT OFFICE 21,746

CIGAR BUNCH MACHINE

Rupert E. Rundell, Rockville Centre, N. Y., assignor to International Cigar Machinery Company, a corporation of New Jersey Original No. 1,948,598, dated February 27, 1934, Serial No. 647,665, December 16, 1932. Application for reissue January 16, 1936, Serial No. 59,430

20 Claims. (Cl. 131—32)

Figure 1:
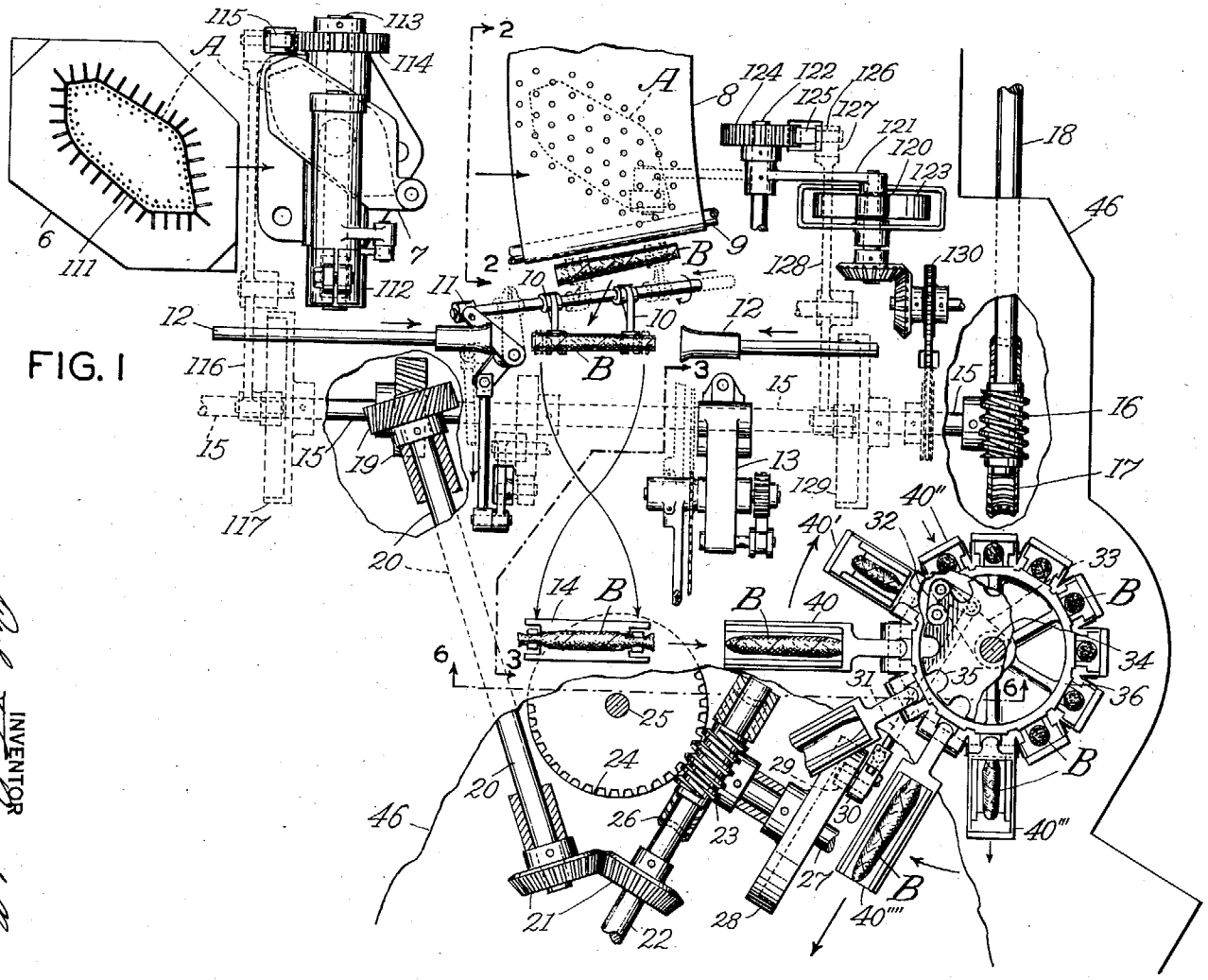

This invention relates to combined scrap bunch rolling and shaping or concentrating machines, particularly to one in which a number of operations hitherto performed by hand are carried out in greater part or wholly by machine, with the object of speeding up the manufacture of the cigars, and improving their quality.

Scrap bunch machines have been limited as to speed because of the time required for the binder girl to lay a binder on the rolling apron and to transfer the rolled bunches from the bunch rolling machines to the mold pocket of the bunch shaper or concentrator.

In laying the binder, the binder girl has to locate the binder in proper position relative to the filler charge in the bunch roller apron pocket. In order to make sure that the hastily laid binder fully enclosed the charge of scrap, it has been necessary to use extra large binders resulting in a considerable waste of binders. Even with this precaution, the binder is sometimes placed too far to one side, with the result that the scrap has been lost from the head or tuck end of the cigar bunch and the cigar has therefore been rejected. It is an object of the invention to produce a scrap bunch machine which obviates these difficulties.

Another object of the invention is to provide an automatic transfer between the scrap bunch rolling unit and the shaping or concentrating unit, and to provide in such a transfer for preventing loss of scrap from the ends of the binder during the transfer movement; also to provide a transfer of this type which will not interfere with the preliminary constricting or shaping of the bunch as it is placed in the pocket of the bunch shaping unit, and will permit substantially full length shaping without slots or notches to admit transfer fingers.

Another object of the invention is to combine with scrap bunch rolling mechanism, a binder paster which will serve to keep the binder closed during subsequent operations or transfers, thus preventing loss of the scrap through opening up the binder and which will also produce bunches which are more uniform as to size for the same reason.

Cigar machines, whether of the scrap or long filler type have either required hand feeding of filler or else the placing of binders by hand with the restricted output due to the multiple duties of the binder girl referred to above. So far as known, the fully automatic feeding of filler particularly of scrap filler, from a bulk source of supply has never been combined with means for automatically cutting to shape and transferring and locating of binders relative to the charge automatically supplied to produce a machine.

Thus it is an object of the invention to produce a machine which is more automatic than any cigar machine hitherto produced requiring a minimum amount of labor and having the maximum speed for machines of this type which machine because of this makes scrap cigars of improved quality due to the more uniform feeding of tobacco and more accurate placing of binders and resulting more certain enclosure of scrap therein.

Another object of the invention is to combine the above with fully automatic transferring of the rolled bunches to the shaping and wrapper applying machine and to insure against loss of scrap from the ends of the bunch during this transfer.

Thus in the new machine all that will be required of the operator at the bunch forming end of the machine will be that she spread a leaf on a leaf cutting die and all other operations preceding the supplying of a wrapper in the wrapping end of the machine will be performed completely by machine.

With these and other objects not specifically mentioned in view, the invention consists in certain constructions and combinations which will be hereinafter fully described and then pointed out in the appended claims.

Figure 2:
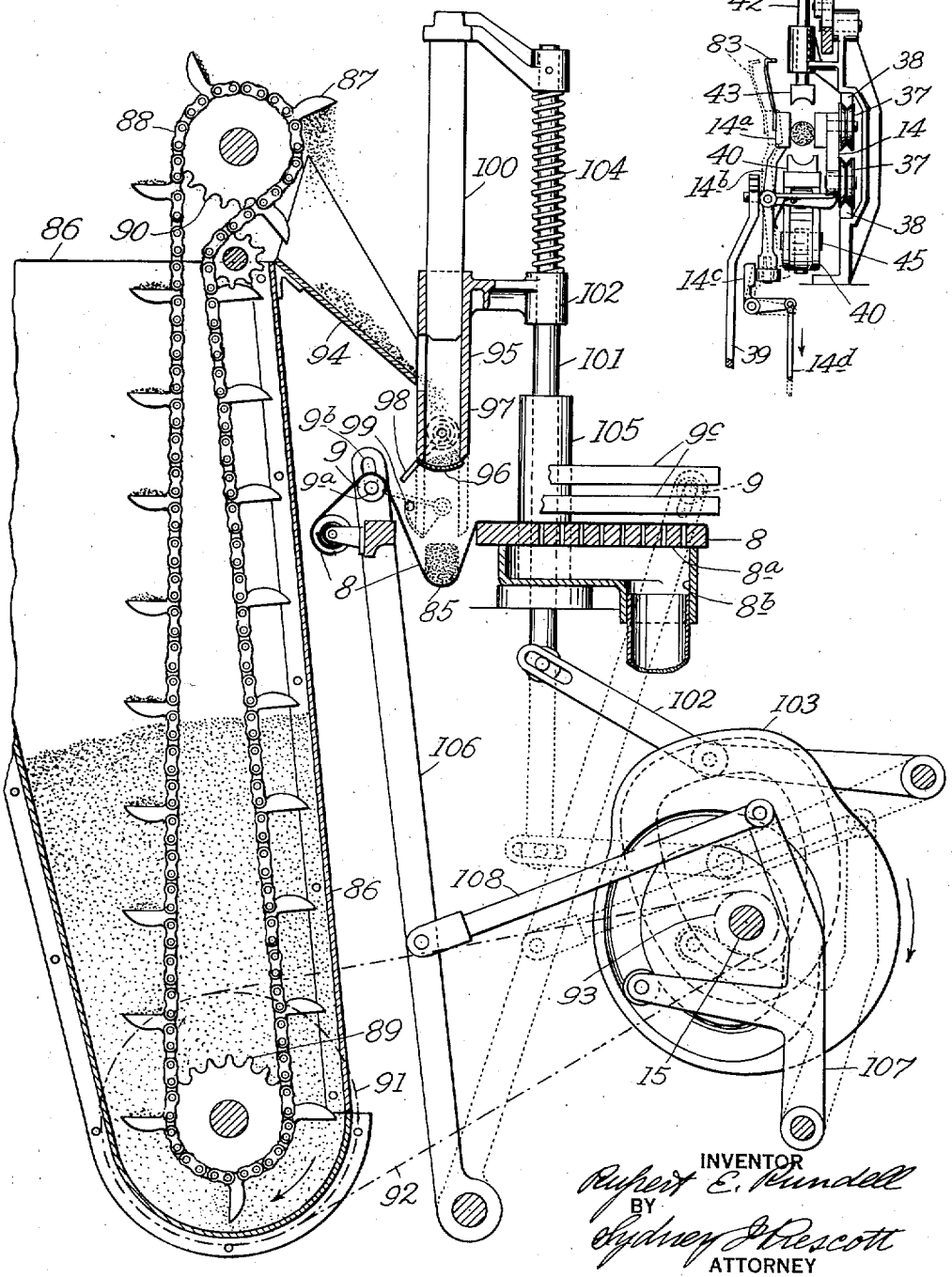
Figure 7:
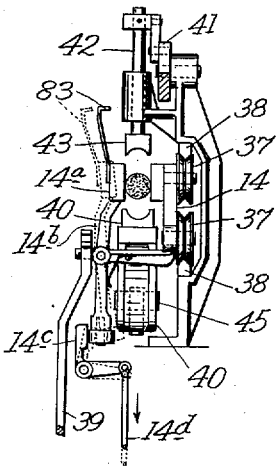

In the accompanying drawings, which form a part of this specification and in which like characters of reference indicate the same or like parts, Fig. 1 is a diagrammatic plan view of a combined scrap bunch rolling and shaping machine embodying the present invention; Fig. 2 is a side elevation on line 2—2 of Fig. 1; Fig. 3 is a side elevation on line 3—3 of Fig. 1, showing the transfer for mechanically taking a bunch from the rolling unit and depositing the same in the loading carriage of the bunch concentrating unit; Fig. 4 is a front elevation on line 4—4 of Fig. 3; Fig. 5 is a top view on line 5—5 of Fig. 3; Fig. 6 is a side elevation on line 6—6 of Fig. 1, showing the operation of the transfer mold of the shaping unit; and Fig. 7 is a front elevation on line 7—7 of Fig. 6, showing the actuating means for opening and closing the jaws of the transfer carriage.

In carrying the invention into effect there is provided in combination with a bunch shaping device, a bunch roller which operates to roll filler tobacco into a binder with the binder projecting beyond the filler together with mechanism for transferring bunches from said roller to said device including two laterally spaced sets of grippers arranged to grip the projecting end portions of the binder to prevent scraps of tobacco from escaping from said ends. The best constructions will also include full length bunch shaping means acting on the bunch in the space between said sets of grippers. The best constructions will also comprise the combination with bunch rolling means including an apron having a charge receiving pocket, of a hopper for holding a supply of scrap tobacco, mechanism for intermittently supplying bunch charges from said hopper to said pocket, a binder cutting die and means for automatically transferring binders from said die onto said apron in position to be rolled by the apron around the charge. Preferably the above will also include means for applying paste to said binder in position to secure the binder about the charge.

These means and parts may be widely varied in construction within the scope of the claims for the particular machine selected to illustrate the invention is but one of many possible concrete embodiments of the same. The invention therefore is not to be restricted to the specific apparatus illustrated and described.

Referring to Fig. 1, the binder A cut by the die 6 is deposited by a suction binder transfer 7, such as that shown in U. S. Patent 1,543,874 to R. E. Rundell, in stretched condition and in unvarying predetermined position upon the rolling apron 8, on which it is wrapped around a measured filler charge by the rolling pin 9, thereby forming a partly shaped bunch B. The latter is delivered by the rolling apron 8, at the end of travel of the rolling pin 9, into the holders 10 of a transfer 11 such as that described in U. S. Patent 1,786,609 to J. F. Halstead. The transfer 11, which has a sliding as well as a swinging motion to rectify the displacement of the bunch due to the curved rolling table, places the bunch B in alignment with a pair of bunch locators 12 which are moved axially by any suitable means (not shown), towards the ends of the same to assure proper position of the bunch with respect to the mechanism to which the bunch is subsequently transferred. The details of the foregoing except as hereinafter indicated, form no part of the present invention, for which reference is made to the above identified patents. For simplicity of illustration these parts are therefore shown for the most part only diagrammatically.

The transfer 13, the construction of which will be described hereinafter, takes the bunch from the holders 10, swings it end for end so that the head of the bunch now points in the opposite direction and inserts it into the jaws of loading carriage 14 which open to receive it, as described in the U. S. Patent 1,785,822 to G. H. Snyder.

The die 6, the binder transfer 7, the rolling pin 9, the rectifying transfer 11, the bunch locators 12 and the loading transfer 13 are actuated in timed relation to each other from a shaft 15 driven by a worm 16 and worm gear 17 from the main drive shaft 18. The shaft 15, by means of spiral gears 19 drives an auxiliary shaft 20 which in turn, by means of bevel gears 21, drives the shaft 22 of the bunch shaping and wrapping unit. The shaft 22 has a worm 23 which, by means of a worm gear 24 turns a vertical shaft 25 on which is mounted a cam operating the carriage 14. The worm 23 by means of a second worm gear 26, also drives a horizontal shaft 27 which has a cam 28 actuating a roller 29 of a cam lever 30 which, by a rod 31 and a bell crank lever 32 pivoted on a floating arm 33 swinging on turret shaft 34, imparts intermittent motion to the Geneva gear 35 driving the turret 36. Thus the drives of all parts of the combined rolling, shaping and wrapping machines are interconnected to obtain proper synchronization of all motions.

The transfer of the bunch B from the loading carriage and auxiliary shaper or compressor 14 to the turret mold is shown in Fig. 6. The carriage 14 is mounted on wheels 37 running on rails 38 and is moved back and forth on these rails by a lever 39 actuated in time by the cam on shaft 25 above referred to. As shown in Fig. 1, the bunch engaging faces of the loading carriage 14 are shaped to the longitudinal cross section of the turret pockets so that the bunches can be pushed therein without injury.

It will be noted that since, as presently described, the transfer fingers 70 operate on the extreme ends of the bunch the carriage compressor faces can be continuous and act substantially the full length of the bunch without need for cutting notches or cavities therein or cutting away the mid portion, to admit the transfer fingers without interference. Such notches tend to produce raised uncompressed portions which give trouble.

As shown in Fig. 7, to give compressing movement to the movable jaw **14*a* of the compressor 14, this jaw is mounted on a lever 14*b* which is given a movement toward and away from the stationary portion of the compressor by means of a bell crank lever 14*c* and link 14*d* operated from the main drive of the machine by any suitable means such as a cam and cam follower, in timed relation to the operation of the rest of the machine. When in loading position above a mold pocket 40, then in horizontal receiving position, a lever 41 operated by a rod 42 actuated by the cam on shaft 25, by means of the rods 42' depresses a plunger 43 which fits into the bunch shaped interior of the carriage and forces the bunch into the mold 40. Upon the withdrawal of the plunger 43, the mold 40, by the turning of the turret, is moved into position 40' in which a stationary cam 44 mounted on turret shaft 34, with which cam each mold is in engagement by means of a roller 45, commences to turn the mold into vertical closing position, the closure of the mold being completed at the next step of the turret in position 40'', Fig. 1. The bunch B then travels in the closed mold around the turret shaft, step by step, until it reaches position 40''' in which the mold begins to open, the complete opening into horizontal position being effected at the next step in position 40''''**, in which the now shaped bunch is ejected and transferred to the wrapping mechanism, as described in U. S. Patent 1,785,822 above cited.

The transfer for conveying the bunch from the rolling unit to the compressor carriage of the shaping unit is shown in Figs. 3 to 5. A pedestal 13 mounted on the base plate 46 of the machine supports a shaft 47 which is swung back and forth through 180 degrees by a gear 48 engaging with a rack 49 actuated by a cam on the shaft 15. The rack 49 is guided by a roller 50 mounted on a stud carried by the pedestal 13. To the shaft 47 is attached an arm 51 which carries stop screws 52 engaging at each end of its stroke with a stud 53 in pedestal 13. The free end of the arm 51 forms a bearing for a shaft 54 to which is fixed a sprocket 55 connected by a chain 56 with a sprocket 57 loosely mounted on shaft 47, but fixed to pedestal 13. The chain 56 held taut by a coil spring 58 connecting its ends, thus imparts a half turn to shaft 54 as the arm 51 swings through 180 degrees, thereby counteracting the reversal of angular position which would otherwise result, due to the swinging of arm 51.

For the purpose of swinging the bunch end for end during transfer, to shaft 54 is affixed a bracket 59 carrying horizontal bearings 60 and a vertical bearing 61. The bearings 60 support a shaft 62 having fixed thereto a gear 63 meshing with a gear 64 rotatable on shaft 54 and affixed to the bearing face of arm 51. In the bearing 61 is journaled a shaft 65 carrying a bevel gear 66 meshing with a bevel gear 67 on shaft 62. To the end of the shaft 65 is affixed a holder 68 carrying the bunch gripper fingers 69 and 70.

As will be seen from Figs. 1 and 4, these grippers are in two sets, which are spaced apart laterally a distance substantially equal to the length of the bunch to grip the bunch by its extreme ends only. Preferably the grippers are spaced apart a distance equal to the length of the filler charge so that the bunch is gripped by the portion of the binder projecting beyond the end of a normal charge, thereby pinching in the binder over the end of the filler to prevent loss of scraps of tobacco and also providing access without interference for subsequent operations on the filler containing portion of the bunch.

The gripper finger 69 is stationarily attached to holder 68, while the clip 70 is movable, being fastened to a plate 71 hinged on a pin 72 in the solid portion of holder 68. Lugs 73 of plate 71 carry a pin 74 on which swings a finger 75 which on its under surface has a projection 76 which is held against a stop plate 77 by a spring 78 stretched between a post 79 in finger 75 and a post 80 in the stationary portion in holder 68, this spring, when free, drawing the movable clip 70 towards the stationary clip 69. The finger 75 and the spring 78 extend through apertures in plate 71 and holder 68. Through the latter aperture also presses a pin 81 attached to plate 71. By depressing the pin 81, the clip 70 is moved away from clip 69, and when the clips are opened far enough to receive a bunch, the projection 76 on finger 75 snaps over the end of stop plate 77 and is held thereagainst by the spring 78 upon the release of pin 81.

In the bunch receiving position of the transfer, shown in dotted lines in Fig. 3, a stop 82 engages with finger 75, thereby disengaging its projection 76 from the stop plate 77 and permitting the spring 78 to close the grippers 70 upon the bunch. The ensuing swing of arm 51 lifts the bunch out of the holders 10 and carries it to the loading carriage 14, to the movable jaw 14*a* of which is attached a hook 83. When this jaw closes, the end of hook 83 depresses pin 81 on its return travel, to open the grippers 70.

As shown in Fig. 2, scrap filler for forming the bunch is deposited in the pocket 85 of the apron 8 by a suitable fully automatic scrap filler feed which takes the tobacco from a bulk supply in a hopper 86 by means of a series of buckets 87 on a chain 88 passing over sprockets 89 and 90 driven through any suitable connections such as the sprockets and chain 91, 92, 93 (diagrammatically shown) from the main shaft 15, in timed relation to the operation of the other parts of the machine.

The scrap tobacco from the buckets is deposited on a chute 94, whence it slides into a funnel 95, having at its bottom end a gate normally spring pressed to closed position by spring 97, and having an arm 98 which engages a stationary pin to open the gate when the funnel 97 is in its lowermost position, as shown in dotted lines in Fig. 2.

To insure ejecting of the filler charge, a plunger plate 100 is provided, secured to plunger rod 101 reciprocated by lever 102 from the cam 103. A spring 104 secured at its ends to rod 101 and a sleeve 102 secured to the funnel and loosely surrounding the rod 101 causes movement of the funnel with the rod until the sleeve strikes the stationary collar 105. Thus movement of the plunger rod 101 will lower the ejector plunger 100 and the funnel 95 in unison until the sleeve 102 strikes the collar 105, whereupon the ejector plunger will move relative to the funnel and eject the charge therein.

After the filler charge has been deposited in the pocket of apron 8, the rolling pin 9 is caused to roll the bunch in the binder B, by means operated from cam 103 by lever 107 and link 108. For proper coaction between the die 6, the transfer 7 and the apron 8 and to maintain the binder in stretched condition, each of these have corresponding flat binder engaging suction surfaces. The perforated apron 8 rests in the perforated flat top of a table 8*a* through which air is drawn into a suction chamber 8*b*. To give the rolling pin 9 movement in a plane parallel to the flat surface of the table the rolling pin is provided with projecting bosses 9*a* at each end engaging in slots in the operating lever 106 and is guided by suitable guide rails 9*c* (shown broken away in Fig. 2). The upper end of the lever of course will be suitably forked or duplexed (not shown) to engage each end of pin 9 in a manner well known in the art.

The details of construction of the scrap tobacco feeding and measuring mechanism form no part of the present invention. However, for a machine showing a more refined mechanism for measuring and feeding the scrap, reference is made to the U. S. patent to Schussler 1,559,009, suitable for use in the present combination.

In the operation of the embodiment described, a measured quantity of filler tobacco is rolled into a binder, cut to shape by a suitable die served by an operator and transferred by suction binder transfer upon the rolling apron of the bunch rolling unit.

For this purpose a die is provided, having a cutting edge 111 of the same outline as the desired cut binder. The operator stretches a leaf on the die, the leaf is cut thereon by suitable means not shown, as rollers passing over the die, and then transferred automatically by the suction transfer head 7 to the rolling apron 8 and placed there in exact predetermined relation to the scrap filler in the pocket. This transfer head 7 is swung from binder receiving to delivering position by means of an arm 112 secured to a shaft 113 oscillated by a pinion 114 and rack 115. The rack is reciprocated by a lever 116 having a pin and slot connection with the rack and rocked by a cam 117 on the shaft 15. A flexible suction pipe connects the transfer head 7 which is of perforated hollow construction, with any suitable source of suction. Since the binder is held in flat stretched condition until and as it is rolled about the filler, substantially less binder material is required and the scrap is more firmly bound therein particularly at the ends where the uniform projection of the binder beyond the ends of the bunch prevents escape of scrap. As already noted, the exact location of the edges of the binder resulting from the use of a binder cutter and transfer in the present device, render it practical to apply paste to a predetermined location on the inner side and near the edge of the binder as shown in Fig. 1.

The binder paster consists of a roller 120 on an arm 121 which is oscillated by a shaft 122 from a position in which it engages a paste roll 123 to a position in which it engages the binder as shown in dotted lines in Fig. 1. The shaft 122 is oscillated by means of a pinion 124 and a rack 125 which rack is reciprocated through a pin 126 engaging in a slot 127 in a rock arm 128 rocked by a cam 129. The paste roll is driven from the shaft 15 by drive mechanism 130.

What is claimed is:

1. In a cigar machine, the combination with a bunch shaping device, of a bunch roller operating to roll filler tobacco in a binder with the binder projecting beyond the filler, mechanism for transferring bunches from said roller to said device including two laterally spaced sets of grippers arranged to grip the projecting end portions of the binder.

2. In a cigar machine, the combination with a bunch shaping device, of a bunch roller operating to roll filler tobacco in a binder with the binder projecting beyond the filler, mechanism for transferring bunches from said roller to said device including two laterally spaced sets of grippers arranged to grip the projecting end portions of the binder, said device including a bunch shaping pocket, and substantially full length bunch shaping means positioned to act on the bunch between said sets of grippers to reduce said bunch substantially to the longitudinal section of the pocket to permit introduction of the bunch into the bunch shaping pocket.

3. In a cigar machine, the combination with a bunch shaping device, of a bunch roller operating to roll filler tobacco in a binder with the binder projecting beyond the filler, mechanism for transferring bunches from said roller to said device including two laterally spaced sets of grippers arranged to grip the projecting end portions of the binder, said mechanism including instrumentalities for swinging the bunch end for end during said transfer.

4. In a cigar machine, the combination with a bunch shaping device, of a bunch roller operating to roll filler tobacco in a binder with the binder projecting beyond the filler, mechanism for transferring bunches from said roller to said device including two laterally spaced sets of grippers arranged to grip the projecting end portions of the binder, said device including a rotating turret carrying an endless series of bunch shaped pockets, and shaping elements coacting with said pockets to surround and concentrate the bunch, and means for relatively separating said pockets and elements prior to transferring the bunch into the pocket.

5. In a cigar machine, the combination with a bunch shaping device, of a bunch roller operating to roll filler tobacco in a binder with the binder projecting beyond the filler, mechanism for transferring bunches from said roller to said device including two laterally spaced sets of grippers arranged to grip the projecting end portions of the binder, a binder cutting die, and a transfer for transferring a binder from said die to said bunch roller.

6. In a cigar machine, the combination with a bunch shaping device, of a bunch roller operating to roll filler tobacco in a binder with the binder projecting beyond the filler, mechanism for transferring bunches from said roller to said device including two laterally spaced sets of grippers arranged to grip the projecting end portions of the binder, a binder cutting die, a transfer for transferring a binder from said die to said bunch roller, and a pasting device for applying a dab of paste to the edge of said binder to hold the same closed during transfer.

7. In a cigar machine, the combination with bunch rolling means including an apron having a charge receiving pocket, of a hopper for holding a supply of scrap tobacco, mechanism for intermittently supplying bunch charges from said hopper to said pocket, a binder cutting die, means for automatically transferring binders from said die on to said apron in position to be rolled by the apron around the charge, a bunch shaping device, and mechanism for transferring bunches from said bunch rolling means into said device, said bunch transferring mechanism including a swinging arm and gripping means on said arm arranged to pinch the binder at the ends of the bunch to prevent escape of scrap tobacco therefrom.

8. In a cigar machine, the combination with bunch rolling means including an apron having a charge receiving pocket, of a hopper for holding a supply of scrap tobacco, mechanism for intermittently supplying bunch charges from said hopper to said pocket, a binder cutting die, means for automatically transferring binders from said die on to said apron in position to be rolled by the apron around the charge, an endless series of bunch shaping pockets, and mechanism for transferring bunches from said bunch rolling means into said pockets, said bunch transferring mechanism including a swinging arm and gripping means on said arm arranged to pinch the binder at the ends of the bunch to prevent escape of scrap tobacco therefrom.

9. In a cigar machine, the combination with bunch rolling means including an apron having a charge receiving pocket, of a hopper for holding a supply of scrap tobacco, mechanism for intermittently supplying bunch charges from said hopper to said pocket, an endless series of bunch shaping pockets, and mechanism for transferring bunches from said bunch rolling means into said pockets, said transferring mechanism including means for locating the bunch to center the same relative to the pockets, said bunch transferring mechanism including a swinging arm and gripping means on said arm arranged to pinch the binder at the ends of the bunch to prevent escape of scrap tobacco therefrom.

10. In a cigar machine, the combination with a bunch shaper, of a bunch roller including an apron having a charge receiving pocket and operating to roll a charge from the pocket into a binder placed on said apron, of a hopper for holding a supply of scrap tobacco, mechanism for intermittently supplying bunch charges from said hopper to said pocket, mechanism for transferring bunches from said roller to said shaper, and means for applying paste to the binder prior to rolling by said apron to prevent opening up of the binder and consequent loss of scrap during transferring by said mechanism, said bunch transferring mechanism including a swinging arm and gripping means on said arm arranged to pinch the binder at the ends of the bunch to prevent escape of scrap tobacco therefrom.

11. A transfer for scrap tobacco cigar bunches comprising a swinging arm and gripping means on said arm arranged to pinch the binder at the ends of the bunch to prevent escape of scrap therefrom.

12. The combination with a bunch machine forming cigar bunches having a binder longer than the filler of the bunch, of a transfer having two spaced sets of grippers spaced apart a distance approximately equal to the length of the filler to pinch the binder over the ends of the filler.

13. The combination with means of a length substantially equal to the length of a bunch filler charge for shaping a bunch to predetermined cross section, of means for transferring to the shaper a charge of filler wrapped in a binder longer than the filler charge by the loose ends of the binder, said means straddling the shaper.

14. A transfer for cigar bunches having the binder projecting beyond the filler, of laterally spaced grippers arranged to grip the projecting portions of the binder, means having to and fro movement for moving said grippers, and mechanism for opening and closing said grippers.

15. A transfer for scrap cigar bunches having sets of grippers spaced apart nearly the length of the bunch for gripping the bunch by its extreme end portions only to constrict said ends and prevent loss of scrap therefrom.

16. In a cigar machine, the combination with a bulk source of supply of scrap tobacco, of a bunch shaping device, a bunch roller operating to roll filler tobacco in a binder, means for separating bunch charges from said source of supply and delivering them to said roller, mechanism for transferring bunches from said roller to said device, a binder cutting die, a transfer for transferring a binder from said die to said bunch roller in timed relation to the operation of said means, and a paster operating to apply paste to the binder which has been deposited upon said bunch roller preparatory to the rolling operation, said paster being adapted to apply paste to that end of the binder which will be the trailing end when the binder is rolled upon the charge, said binder when so rolled and adhered at said pasted end acting to confine and hold said charge in place, and thus to prevent loss of scrap during transfer to said bunch shaping device.

17. In a cigar machine, the combination with a bulk source of supply of scrap tobacco, of a bunch shaping device, a bunch roller operating to roll filler tobacco in a binder, means for successively separating bunch charges from said source of supply and delivering them to said roller in timed relation to the operation of said bunch roller to be rolled in said binder, mechanism for transferring bunches from said roller to said device, a binder cutting die, a transfer for transferring a binder from said die to said bunch roller, and a paster operating in timed relation to the operation of said bunch roller to apply paste to the binder which has been deposited upon said bunch roller preparatory to the rolling operation, said paster being adapted to apply said paste to that end of the binder which will be the trailing end when the binder is rolled upon the charge, said binder when so rolled and adhered at said pasted end acting to confine and hold said charge in place, and thus to prevent loss of scrap during transfer to said device, said device comprising a traveling member having an endless series of cigar form pockets into which bunches are successively transferred by said transferring mechanism.

18. In a cigar machine, the combination with a bunch shaping device comprising a rotating drum having arranged about its circumference an endless series of cigar-shaped pockets, of a bunch roller operating to roll scrap tobacco in a binder, a hopper providing a bulk source of supply of scrap tobacco, a casing providing a channel, means feeding tobacco from said supply to said channel, means for delivering bunch charges from said channel to said roller, mechanism for transferring bunches from said roller to said device, a binder cutting die, a transfer for transferring a binder from said die to said bunch roller, intermittent drive mechanism for intermittently rotating said drum, and driving connections between said intermittent mechanism and said bunch roller and said transferring mechanism to operate the same in timed relation, said transfer mechanism including means holding the binder closed against loss of scrap from the bunch during movement of said transfer towards the shaping device.

19. In a cigar machine, the combination with bunch rolling means including a rolling apron arranged to form a charge receiving pocket, of a hopper for holding a supply of scrap tobacco, mechanism for intermittently supplying bunch charges from said hopper to said pocket, a rotatable drum, an endless series of bunch shaping pockets arranged about the circumference of said drum, mechanism for transferring bunches from said bunch rolling means into said pockets, and means acting on the binder to prevent opening of the body portion thereof, said transferring mechanism including means coacting with the ends of the bunch to prevent loss of scrap from said ends during movement of said transferring mechanism towards said rotatable drum.

20. In a cigar machine, the combination with a bunch roller including an apron adapted to form a charge receiving pocket and operating to roll a binder placed on the apron about a charge placed in the pocket, means applying suction to said apron to hold the binder thereon, a hopper for holding a supply of scrap tobacco, a casing providing a channel, mechanism for intermittently supplying bunch charges from said hopper to said channel, means for delivering bunch charges from said channel to said pocket, a binder cutting bed, means cooperating with said bed to transfer a binder onto said apron with a cut edge to be held by suction in predetermined position thereon, a paster arranged to apply paste at that corner of said edge which will be the trailing end when rolled upon the bunch, said pasted edge acting to hold the overlapping rolled binder in place, and thus to prevent opening of the binder and loss of scrap during transfer, and means operating in timed relation to the operation of said supplying mechanism for causing said paster to apply paste to the binder prior to the rolling of each charge and after it is removed from said bed.

RUPERT E. RUNDELL.